United States Patent [19]

Burke, Jr.

[11] 4,107,745

[45] Aug. 15, 1978

[54] TAPE SPEED CONTROL APPARATUS

[75] Inventor: Edward F. Burke, Jr., Reading, Mass.

[73] Assignee: MFE Corporation, Salem, N.H.

[21] Appl. No.: 785,021

[22] Filed: Apr. 6, 1977

[51] Int. Cl.² ............................................. G11B 5/00
[52] U.S. Cl. ..................................... 360/73; 360/130; 360/90; 226/186; 226/191
[58] Field of Search ..................... 360/73, 93, 130, 90, 360/96; 226/186, 196, 198, 181, 186, 187, 191, 97

[56] References Cited

U.S. PATENT DOCUMENTS

| 2,493,056 | 1/1950 | Bartelson | 226/198 X |
| 2,624,574 | 1/1953 | Camras | 226/186 |
| 3,332,084 | 7/1967 | Wahrer et al. | 360/90 |
| 3,506,271 | 4/1970 | Greifenhagen et al. | 360/96 |

FOREIGN PATENT DOCUMENTS 2,212,210  10/1973  Fed. Rep. of Germany ............ 360/90

Primary Examiner—John H. Wolff
Attorney, Agent, or Firm—Cesari and McKenna

[57] ABSTRACT

A signal generator for producing signals indicative of the speed of tape driven reel to reel in a tape cassette transport in lieu of timing signals recorded directly on the tape is used to control the reel motors that drive the cassette. The tape-engaging drive wheel is designed to minimize slippage between the moving tape and the drive wheel so that the generator output accurately reflects tape speed.

4 Claims, 3 Drawing Figures

TAPE SPEED CONTROL APPARATUS

BACKGROUND OF THE INVENTION

This invention relates to tape speed control apparatus. It relates more particularly to a signal generator which can be incorporated easily into a tape transport to provide output signals indicative of the true tape speed that can be used to control the tape drive motors.

In magnetic tape transports of the type with which we are concerned which drive the tape reel to reel in a cassette, the tape should move at substantially constant speed between the let-off reel and the take-up reel. Heretofore, it has been the practice to control tape speed by controlling the current applied to the reel drive motors in accordance with timing signals prerecorded on a tape timing track. Since the magnetic tape is relatively narrow, the required presence of the timing track has meant that one less track is available for recording data.

Of course one answer is to make the tape wider so that it can accommodate both the timing track and one or more extra data tracks. However this solution requires, in addition, wider reels, a non-standard cassette and a wider read/write head to accommodate the wider tape, all of which add to the overall size and cost of the tape transport.

It has also been proposed to use signals from a tape driven tachometer or encoder in lieu of the timing track signals to control the reel drive motors in various web handling apparatus including devices that transport tapes between large reels. In such apparatus, the tape or web moving from one reel to the other is engaged around a rotary drive shaft or wheel connected to a rotor in the encoder. Rotation of the rotor causes the encoder to produce output signals indicating the speed of the tape. In order for the speed indication to be accurate, however, there must be no slippage between the encoder drive wheel and the moving tape. For this reason, it has been the practice theretofore to make the drive wheel relatively large in diameter and to provide a considerable amount of tape wrap around the wheel. This maximizes the surface contact between the tape and wheel and thus minimizes slippage between the two. That arrangement is not feasible, however, in cassette tape transports. This is because the tape that must be engaged by the encoder drive wheel is contained entirely within the cassette housing. Therefore the drive wheel must engage the tape through an opening in the edge of the cassette which because of various constraints must be of limited size. Also the wheel can only project into the cassette a fraction of an inch so that the amount of tape wrap about the drive wheel is very limited. Consequently there is slippage between the wheel and the tape so that the output of the encoder does not accurately reflect the speed of the tape.

For these reasons the industry has tended to retain the tape timing track to control tape speed in cassette type transports and thus forego the ability to store more data on a given width tape.

SUMMARY OF THE INVENTION

It is the aim of the present invention, then, to provide improved tape speed control apparatus for a tape cassette transport.

Another object is to provide an apparatus of this type whose output accurately reflects tape speed.

A further object of the invention is to provide such apparatus which permits more data to be stored in a cassette controlled by the transport.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

Briefly, when the drive wheel or shaft of a timing signal generator is engaged and rotated by a tape moving at relatively high speed, air is entrained between the tape and the peripheral surface area of the drive wheel engaged by the tape. The air functions as a bearing encouraging slippage between the wheel and the tape. This phenomenon is not so much a problem when the tape has appreciable wrap around the wheel. However, it does become critical when, as in a cassette transport, only a small amount of tape wrap is possible. I have found that by preventing the formation of such an air bearing, a timing signal generator drive wheel will truly follow a moving tape even though the wheel is relatively small and the tape enjoys only a minimal amount of wrap about the wheel. Consequently, now such a signal generator in the form of an encoder or tachometer can be used to control tape speed in a cassette type transport in lieu of a timing track on the tape itself, thereby permitting more data to be stored on the tape.

The subject apparatus can be incorporated into an otherwise standard tape cassette transport of modest size in that it is quite compact. It comprises a timing signal generator having a housing in which shaft carrying a circular apertured disk is rotatively mounted. Positioned on opposite sides of the disk are a lamp and a pair of photo detectors. All external connections to the generator lamp and detectors are conveniently made at the terminals of a printed circuit board projecting out of the housing.

The end of the shaft extending from the housing is fitted with a special wheel that is normally disposed opposite a stretch of tape in the tape transport. The wheel is quite small and has a relatively resilient periphery that is provided with one or more spaced-apart grooves. When the tape is advanced at high speed, these grooves prevent the formation of an air bearing between the tape and wheel so that there is minimal or no slippage between those elements. Resultantly, the generator shaft and disk are rotated at a speed that is directly proportional to tape speed.

When the disk is rotated, the apertures in the disk are brought into register with the lamp and detectors in succession so that the detectors become illuminated by brief light pulses whose interval is determined by the tape speed. The detectors thereupon produce corresponding electrical pulses which are present at the terminals on the exposed end of the printed circuit board. These pulses are applied to a control circuit that controls the speed of the transport's tape drive motors.

Thus the present apparatus has essentially only one moving part. Therefore it is extremely light in weight and has minimum inertia. This, coupled with the fact that there is excellent coupling between the moving tape and the generator drive wheel ensures that the apparatus is also highly responsive to changes in, and accurately reflects, tape speed.

Further, the overall apparatus is quite small and its cost is relatively low to that its incorporation into high speed tape transports should be an industry-acceptable alternative to controlling tape movement by prerecorded timing signals on the tape.

BRIEF DESCRIPTION OF THE DRAWING

For a fuller understanding of the nature and objects of the invention, reference should be had to the following detailed description taken in connection with the accompanying drawing in which.

DESCRIPTION OF THE PREFERRED EMBODIMENT

Figure 1:
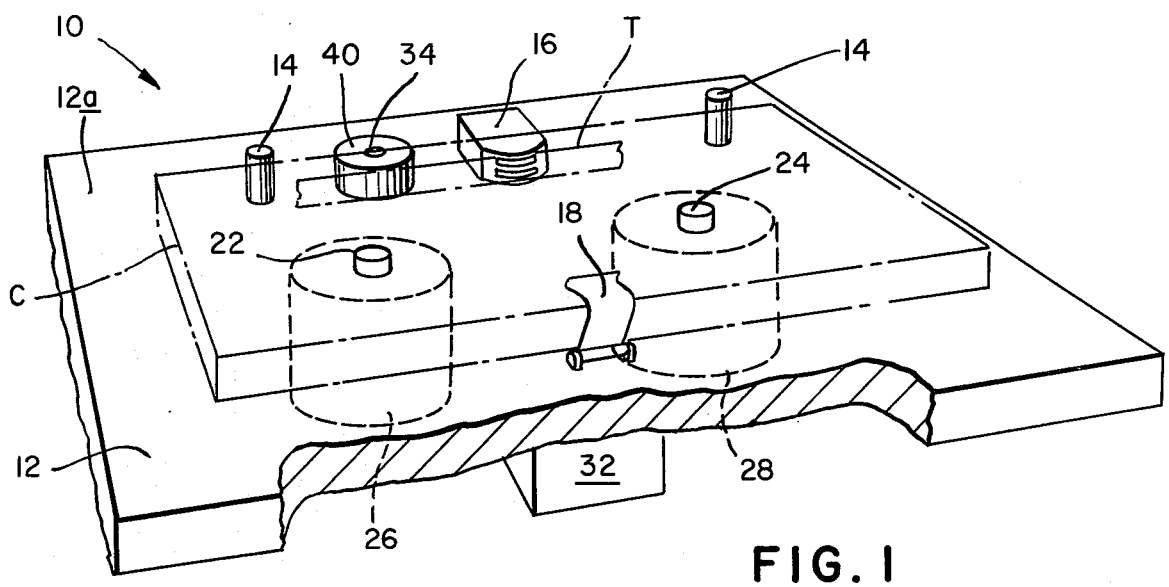
FIG. 1 is a fragmentary perspective view of a tape transport incorporating tape speed control apparatus made in accordance with this invention.

Referring first to FIG. 1, of the drawings, a tape transport indicated generally at 10 has a base 12 with a flat surface 12a supporting a standard magnetic tape cassette shown in dotted lines at C. Locating pins 14 projecting up from surface 12a position the front edge of the cassette so that the transport's read/write head 16 projects into the usual access opening found in the active edge of the cassette. The rear edge of the cassette is removably retained by a suitable clip 18 hingedly connected to base 12.

Transport 10 includes the usual rotary spindles 22 and 24 projecting up from base surface 12a. The spindles drive the take-up and let-off reels in cassette C when the cassette is properly seated in the transport. The spindles 22 and 24 are driven by suitable drive motors 26 and 28 respectively. These motors are connected in a suitable control circuit 32 which controls the direction and speed of motors 26 and 28 in accordance with signals received from a timing signal generator in the form of an incremental encoder 34 so as to maintain the speed of the tape T in cassette C constant.

Figure 2:
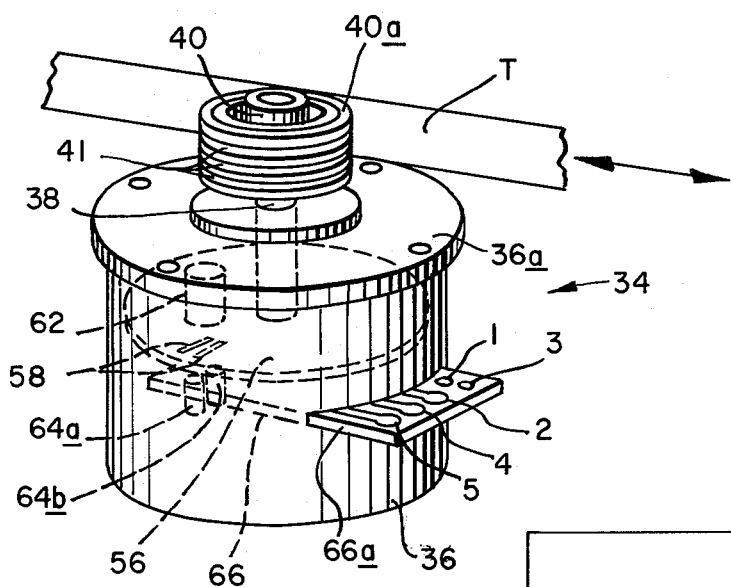
FIG. 2 is a perspective view on a larger scale showing part of the apparatus in greater detail.

Referring to FIGS. 1 and 2, encoder 34 includes a generally cylindrical housing 36 from one end of which projects a rotary shaft 38. A specially designed wheel 40 is secured to the outer end of the shaft. The encoder 34 is secured to the transport base 12 by way of housing flange 36a with shaft 38 projecting up from the base surface 12a and with the rim of wheel 40 protruding slightly, e.g. 0.1 inch into the active edge of the cassette so that it engages tape T in the usual way as indicated in FIG. 1. Typically there is only on the order of 0.04 to 0.05 inch wheel-to-tape interference.

Wheel 40 has a relatively small diameter, typically only 0.5 inch. Its outer surface 40a is resilient to improve its frictional engagement with the tape. Also as best seen in FIG. 2, the wheel has at least one, and preferably several, grooves 41 in its peripheral surface. These may be diagonal or wavy, but most preferably they are circular. Typically the grooves are on the order of 0.02 inch wide and 0.2 inch deep. These grooves permit the escape of air normally entrained between the fast moving tape and the wheel so that there is no trapped air that could cause slippage between the tape and the wheel. Thus the wheel truly follows the tape.

When the tape T is advanced, the encoder shaft 38 and wheel 40 are rotated at a rate directly proportional to the tape speed. The encoder thereupon produces electrical output signals indicative of that speed which are applied to control circuit 32. Circuit 32 compares those signals with a reference signal and controls motor 26 and 28 as needed to maintain substantially constant tape speed. Circuit 32 can comprise any one of a number of conventional negative feedback control arrangements. Therefore it need not be detailed here.

As best seen in FIG. 2, secured to the end of shaft 38 inside housing 36 is a thin, circular opaque disk 56 having one or more circumferentially spaced apertures 58 near its periphery. A lamp 62 is positioned in the housing on one side of the disk and a pair of photo-diode detectors 64a and 64b are positioned on the opposite side of disk 56 directly opposite the lamp. These detectors are conveniently supported by printed circuit board 66 having an end 66a projecting outside the housing. External connections to the encoder are made at terminals 1 to 5 located on this exposed end of the printed circuit board.

Figure 3:
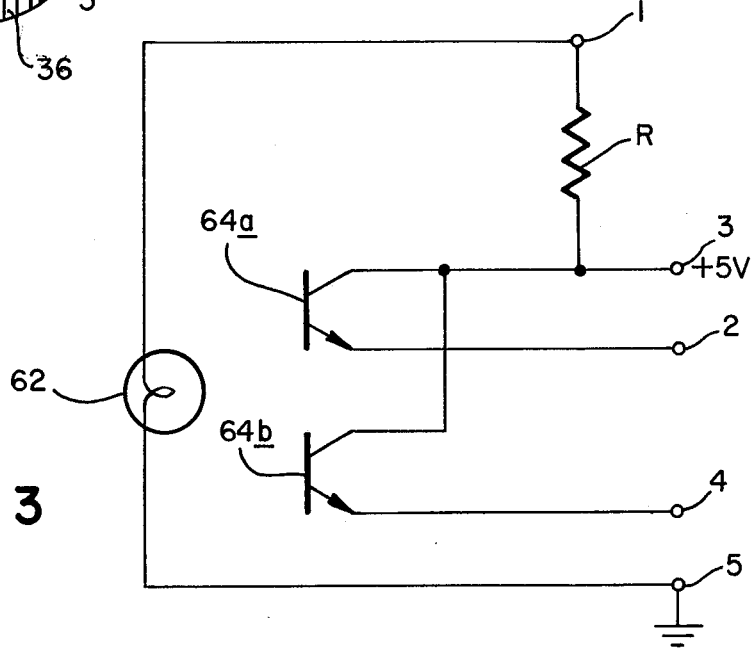
FIG. 3 is a schematic diagram showing the various connections between the electrical components of the apparatus.

The circuit board also carries printed leads connecting the emitter of photo-diode 64a to terminal 2, and the emitter of diode 64b to terminal 4. The collectors of the two diodes are both connected to the common terminal 3. Also the electrical leads from lamp 62 are connected to printed leads on circuit board 66, with one such lead being connected to terminal 5 and the other lead being connected to terminal 1. FIG. 3 shows all these connections schematically. A rating resister R (FIG. 3) is usually connected between terminals 1 and 3. The outputs of the two photo-diodes are connected to the control section 32 (FIG. 1) to control the motors 26 and 28 to maintain the speed of tape T constant. Typically, the outputs of the two photo-diodes are connected in quadrature so as to provide also an indication of the direction of tape movement.

With this arrangement, encoder 34 controls the movement of the tape quite accurately. Due to the presence of the specially designed wheel 40, there is no air bearing between the moving tape and the wheel as would cause slippage. Therefore, the output of the encoder provides a true indication of the speed of the tape. Also, the encoder itself is quite small and has minimal inertia so that it responds quickly to change in tape speed. Thus, when the output of the encoder is applied via control section 32 to control the let-off and take-up motors 26 and 28, tape speed is controlled within very close tolerances. Consequently, this apparatus is a satisfactory alternative to the previously used systems in which the timing signals for controlling tape movement are located on a timing track on the tape itself, particularly since more data can be recorded on a given width tape.

It will be seen from the foregoing then that the objects set forth above are efficiently attained and since certain changes may be made in the above construction without departing from the scope of the invention, it is intended that all matter contained in the above description or shown in the accompanying drawing be interpreted as illustrative and not in a limiting sense.

It is also to be understood that the following claims are intended to cover all of the generic and specific features of the invention herein described.

I claim:

1. Apparatus for controlling tape speed in a high speed capstanless tape transport having a tape cassette-supporting surface, means for locating a cassette on that surface, a pair of motor driven let-off and take-up spindles projecting up from that surface for engagement in the cassette and a read/write head projecting up from the surface adjacent the spindles, said apparatus comprising:

A. a timing signal generator, said generator including
  (1) a housing,
  (2) a shaft rotatively mounted in the housing, and
  (3) means for producing an electrical output in response to rotation of the shaft.

B. means for mounting the housing in the transport so that said shaft projects up from the supporting surface thereof at a point substantially aligned with the read/write head therein, C. a wheel mounted on said shaft, said wheel being dimensioned to project into the cassette supported on the tape transport with the periphery of the wheel providing the sole means for engaging the tape therein with sufficient interference so that when the tape is moving past the head it turns the wheel correspondingly whereby the generator produces an electrical output indicative of the speed of the tape past the head, D. means defining one or more grooves in the peripheral surface of the wheel, said grooves extending around the circumference of the wheel so as to prevent entrainment of air between the wheel and the tape, E. a control circuit for controlling the spindle motors, and F. means for applying the output of the generator to the control circuit so that the spindles are driven so as to maintain the speed of the tape past the read/write head substantially constant.

2. The apparatus defined in claim 1 wherein the wheel has a resilient periphery.

3. The apparatus defined in claim 1, wherein there are two or more of said grooves and they are circumferential and spaced axially along the wheel.

4. The apparatus defined in claim 1 and further including a cassette supported on the tape transport.

* * * * *